United States Patent [19]

Kawarada

[11] 4,260,231
[45] Apr. 7, 1981

[54] ELECTRONIC FLASH DEVICE

[75] Inventor: Osamu Kawarada, Fuchu, Japan

[73] Assignee: Olympus Optical Co., Ltd., Tokyo, Japan

[21] Appl. No.: 67,360

[22] Filed: Aug. 17, 1979

[30] Foreign Application Priority Data

Sep. 14, 1978 [JP] Japan .............................. 53-113364

[51] Int. Cl.³ ...................... G03B 15/03; G03B 15/02
[52] U.S. Cl. ..................................... 354/128; 354/145
[58] Field of Search ........ 354/288, 289, 202, 126–128, 354/141, 145

[56] References Cited

U.S. PATENT DOCUMENTS

| 2,911,809 | 11/1959 | Nojiri | 354/128 |
| 3,733,986 | 5/1973 | Hayashi et al. | 354/289 |
| 4,065,779 | 12/1977 | Lange | 354/145 |
| 4,080,612 | 3/1978 | Maitani et al. | 354/126 |
| 4,100,554 | 7/1978 | Iijima | 354/145 |
| 4,130,356 | 12/1978 | Yamanaka | 354/145 |
| 4,153,355 | 5/1979 | Ikawa et al. | 354/145 X |

FOREIGN PATENT DOCUMENTS

| 2803034 | 8/1978 | Fed. Rep. of Germany | 354/288 |
| 1404405 | 5/1965 | France | 354/126 |

Primary Examiner—Donald A. Griffin

[57] ABSTRACT

An electronic flash device comprises a switch member moving in response to on-off operations of a power switch, and an interlocking mechanism for interlocking the switch member with said indicating member, so that an indicating lamp is projected outward from the flash device by the operation of said power switch so as to indicate a charged voltage in a main capacitor for flashing.

7 Claims, 14 Drawing Figures

ELECTRONIC FLASH DEVICE

BACKGROUND OF THE INVENTION

This invention relates to an electronic flash device with an on-off indicator for a power switch.

Heretofore, a charge or battery check lamp to indicate the on or off state of a power switch in an electronic flash device has been located inside an flash device body, so that a photographer, when using the electronic flash device with his camera, has had to watch the check lamp to make sure that the lamp is lighted before depressing the shutter button of the camera. Thus, the photographer would be required to use additional care to the lighting of the check lamp, often mistaking the on-off state of the power switch to fail in photographing.

SUMMARY OF THE INVENTION

The object of this invention is to provide an electronic flash device with an on-off indicator for a power switch located at a conspicuous portion of a flash device body to indicate positively the on-off state of the power switch, and enabling a user to make sure by watching a check lamp that the switch is on the moment the switch is turned on.

DETAILED DESCRIPTION OF THE PREFERRED EMBODIMENT

Figure 1:
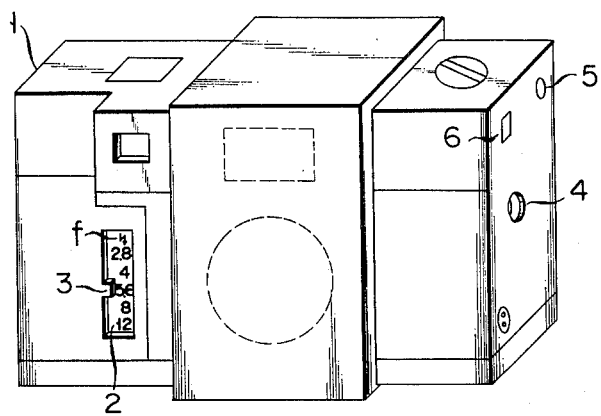
FIG. 1 is a perspective view of a camera for exclusive use with an electronic flash device according to this invention.

In FIG. 1, numeral 1 designates a camera body for exclusive use with an electronic flash device according to this invention. The camera body 1 is provided with a stop scale 2 bearing a flash mark f at the top end and a stop adjusting lever 3 capable of vertically sliding along the stop scale 2 on the front, and also with a tapped hole 4 for mounting the electronic flash device, a slot 5 to hold a flash device mounting guide as mentioned later, and a bore 6 in which a projected portion of an engaging member of a switch operating mechanism as mentioned later is fitted.

Figures 2A, 2B:
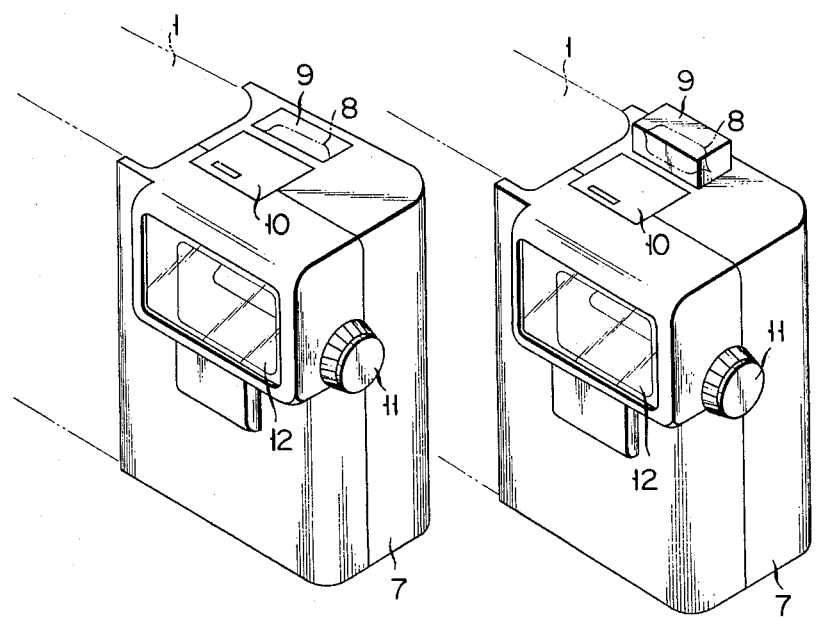
FIGS. 2A and 2B are perspective views of the electronic flash device according to the invention mounted on the camera of FIG. 1, showing the off and on states of a power switch of the electronic flash device, respectively.

In FIGS. 2A and 2B, numeral 7 designates a flash device body attached to the latteral side of the camera body 1. The flash device body 7 is provided with an on-off indicator 9 containing a charge check lamp 8 therein, a battery hatch 10, a fixing screw 11 at the side for fitting the flash device to the camera body 1, and a flashing window 12 substantially flush with the front of the camera.

Figure 3:
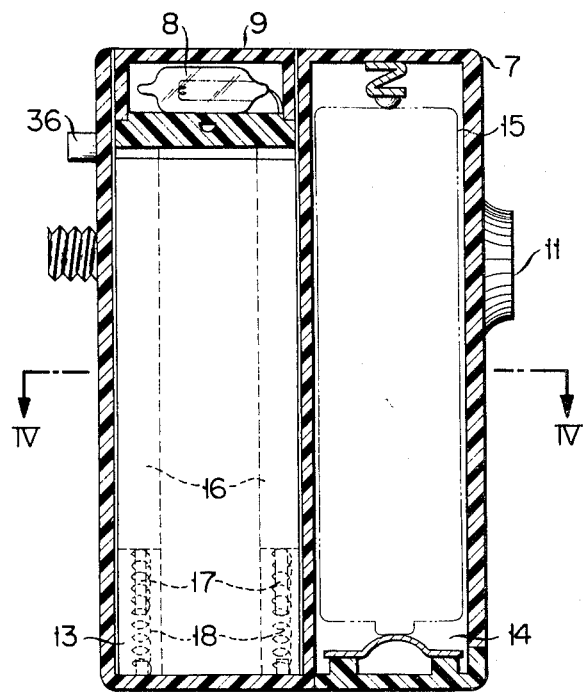
FIG. 3 is a cross-sectional view of the electronic flash device of FIG. 2A.
Figure 4:
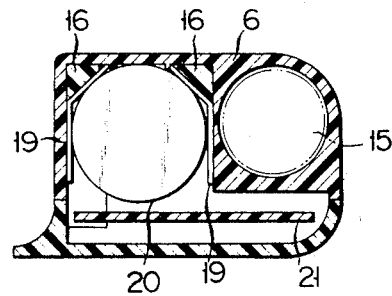
FIG. 4 is a sectional view as taken along line IV—IV of FIG. 3.

As shown in FIGS. 3 and 4, the interior of the flash device body 7 is divided into two chambers 13 and 14. An on-off indicator assembly is disposed in one chamber 13, while a battery 15 is held in the other 14. The on-off indicator 9 has a pair of triangular legs 16 vertically extending and fitted in two adjacent corners of the chamber. The legs 16 are fitted at their respective bottom ends with pins 17. Compression springs 18 are fitted to the pins 17 at the one ends and connected to the pins planted on the bottom of the flash device body 7 so as to define a certain space between the bottom ends of the pins 17 and the bottom of the flash device body 7. Further, a main capacitor 20 is disposed between the pair of legs 16 through partition plates 19 for isolating the capacitor 20 from the legs 16. Numeral 21 denotes a substrate of a power circuit of the electronic flash device.

Figure 5:
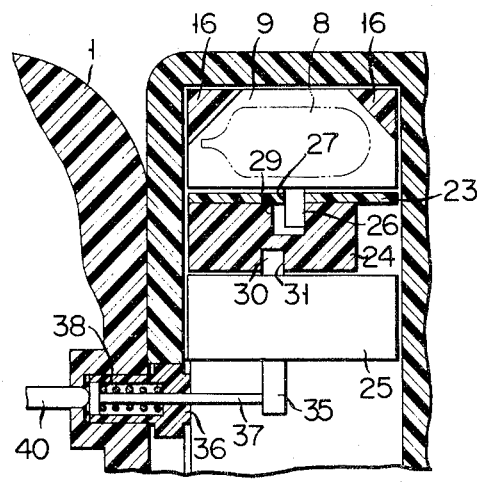
FIG. 5 is a cross-sectional view of the part of the electronic flash device mounted on the camera.
Figure 6:
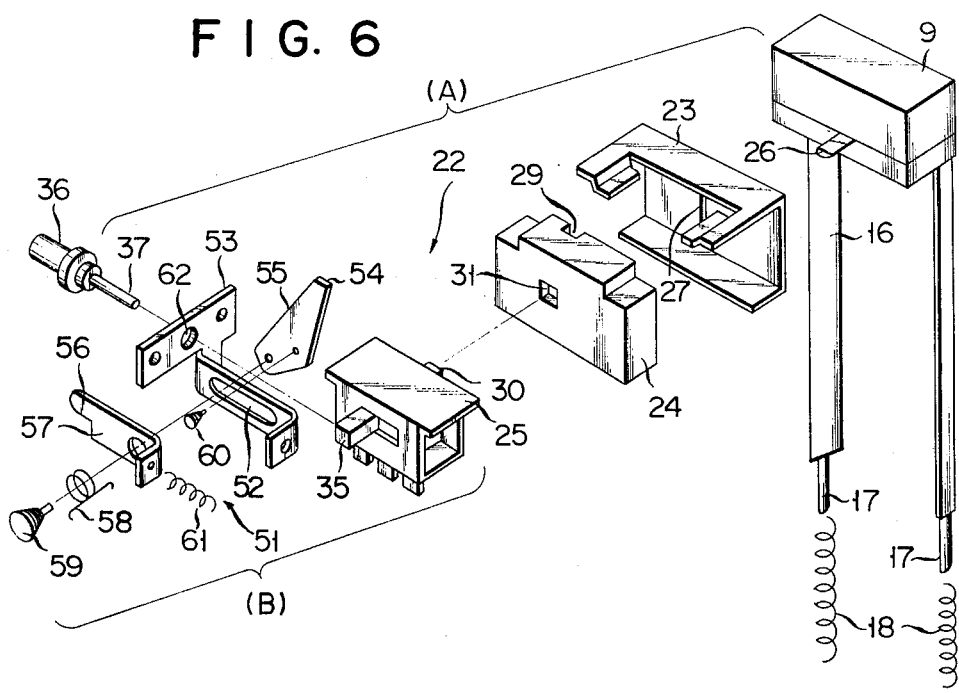
FIG. 6 is an exploded perspective view of an indicating mechanism and a switch operating mechanism of the electronic flash device.
Figure 7A:
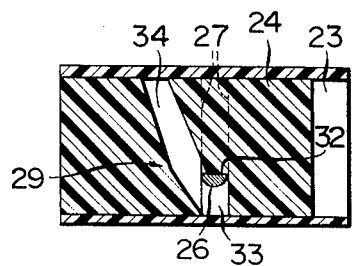
FIGS. 7A, 7B and 7C are cross-sectional views of a cam frame portion for illustrating the cam operations of the indicating mechanism.
Figure 7B:
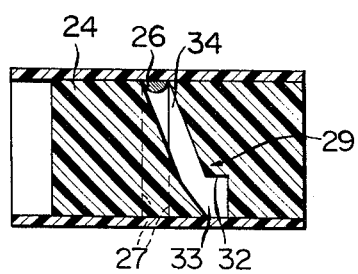
Figure 7C:
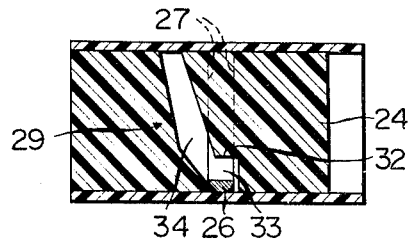

FIGS. 5, 6 and 7A to 7C show a projecting mechanism 22 for projecting the on-off indicator 9 from the flash device body 7. The projecting mechanism 22 has such construction that the on-off indicator 9, a mounting frame 23, a cam frame 24, and a power switch 25 are arranged horizontally in a line in this order. The on-off indicator 9 has a projection 26 protruding horizontally from one side thereof. The mounting frame 23 has a guide opening 27 in which the projection 26 of the on-off indicator 9 may be moved up and down. The cam frame 24 has on one side thereof a cam groove 29 of such a shape as shown in FIGS. 7A to 7C along which the projection 26 of the on-off indicator 9 is to move, and on the other a square cavity 31 in which a switch operating projection 30 of the power switch 25 is fitted. As shown in detail in FIG. 7A, the cam groove 29 includes a first path 33 vertically extending to a stepped portion 32 and a second path 34 extending obliquely from the stepped portion 32 toward the upper left as illustrated and adjoining the first path 33. The power switch 25 is provided with an extending portion 35 extending from the operating projection 30 beyond the opposite side to the projection 30.

On a side of the flash device body 7 facing the slot 5 in the side of the camera body 1 is a mounting guide 36 which is to be fitted in the slot 5. Inside the mounting guide 36 are a push pin 37 for pushing the extending portion 35 of the power switch 25 and a return spring 38 biasing the pin 37 outward as shown in FIG. 5. In the slot 5 of the camera body 1, on the other hand, is an operating pin 40 driven by a photographing mode switching mechanism 39 disposed inside the camera body 1 so that the pin 37 inside the mounting guide 36 is pushed to turn the power switch 25 on when the stop adjusting lever 3 is set at the flash mark f (FIGS. 5 and 6).

Now there will be described the operation to project the on-off indicator outwardly from inside the flash device body.

First, in attaching the flash device body 7 to the camera body 1, the screw 11 on the side of the flash device body 7 is screwed into the tapped hole 4 in the camera body 1. In doing this, the mounting guide 36 of the flash device body 7 is fitted into the slot 5 of the camera body 1. In this state, the stop adjusting lever 3 of the camera body 1 is adjusted to the position of the flash mark f on the stop scale 2, so that the push pin 37 of the mounting guide 36 pushes the extending portion 35 to turn the power switch on. When the stop adjusting lever is at the flash mark, the flash power switch is continuously on, so that flashing may be repeated.

Thereafter, following the rightward movement of the projection 30 of the power switch 25, the cam frame 24 is also moved to the right. In response to such movement, the projection 26 of the indicator 9 is operated as shown in FIG. 7B from FIG. 7A. That is, the projection 26, which is at first engaged by the stepped portion 32 at the top end of the vertical first path 33 of the cam groove 29, as shown in FIG. 7A, is released from the engagement with the stepped portion 32 and moved upward along the oblique second path 34 to be located at the top end thereof, as shown in FIG. 7B, when the cam frame 24 is moved to the right. Accompanying the movement of the projection 26 to the second path 34, the compression springs 18 on the bottom ends of the legs 16 of the indicator 9 move the indicator 9 upward by its own biasing force. Thus, the indicator 9 may be projected outward beyond the top face of the flash device body 7.

When the operation of the electronic flash device is finished, the indicator 9 is depressed vertically into the flash device body 7 with a finger. By this operation, the projection 26 of the indicator 9 is moved downward along the second path 34 of the cam groove 29 of the cam frame 24. In depressing the indicator 9, it need be forced down until the projection 26 is caused to engage the stepped portion 32 of the cam groove at the top end of the first path 33. Following the downward shifting of the projection 26, the projection 30 of the power switch 25, as well as the cam frame 24, is moved to the left, and the power switch 25 is turned off. In such operation of the power switch 25, once the stop adjusting lever is set at the flash mark f, the electronic flash device is allowed to be operated continuously.

Thus, when the power switch 25 is turned off, the push pin 37 of the mounting guide 36 is moved to the left by the leftward shifting of the extending portion 35 of the power switch 25, whereby the stop adjusting lever of the camera body 1 is shifted from the flash mark f for a switchover to the regular EE photographing.

In the electronic flash device according to this invention, as described above, the indicator with the charge check lamp is projected from the flash device body the moment the power switch is turned on, so that the user may easily ascertain the on-off state of the flash power switch, and may press the shutter without using any additional care, ensuring error-free photographing.

According to the aforementioned switching mechanism, the flash power switch can be turned on for flash photographing by only setting the stop adjusting lever to the flash mark. Further, the flash power switch can be turned off for EE photographing by just depressing the indicator.

Figure 8:
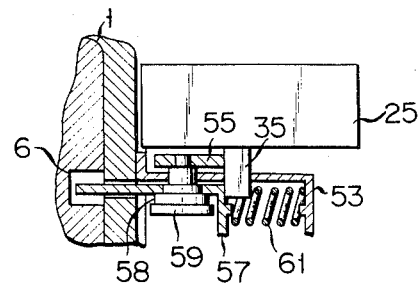
FIG. 8 is a profile of the principal part of the switch operating mechanism attached to the exclusive-use camera.
Figure 9A:
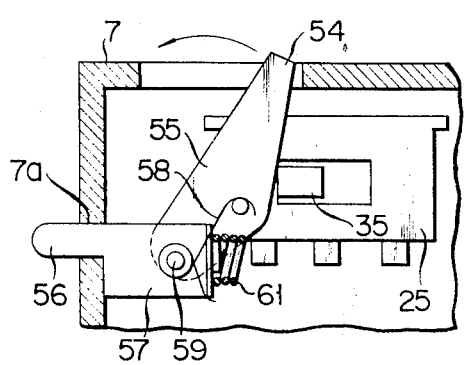
FIGS. 9A, 9B and 9C are cross-sectional views of the transfer mechanism illustrating the operations thereof when it is attached to a general-use camera.
Figure 9B:
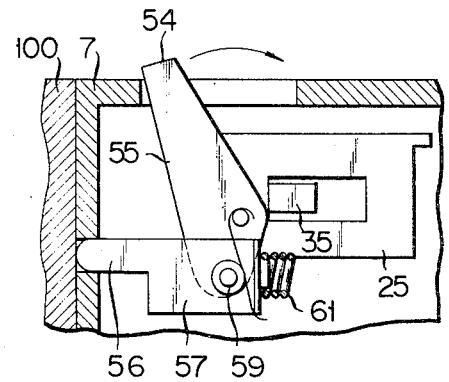
Figure 9C:
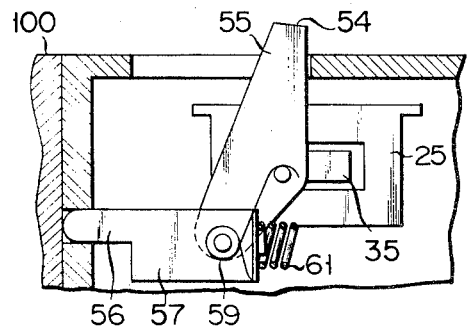

While there has been mentioned a case where the electronic flash device is mounted on the camera for exclusive use with the flash body (FIG. 8), there will now be described a case where the electronic flash device is attached to a camera for general use with reference to the drawings of FIGS. 6 and 9A to 9C. In this case, a manual switch mechanism 51 to operate the electronic flash device includes an L-shaped fixed mounting plate 53 with a slot 52 and fixed to the inner wall of the flash device body 7, a switch operating member 55 with a top end portion 54 protruding outside the device body, and an engaging member 57 with one end having a projection 56 protruding outward from the device body side. The switch operating member 55 is swingably mounted on the tip end of a screw 59 which is allowed to slide inside the slot 52 of the fixed mounting plate 53. The engaging member 57 is held by the screw 59, and allowed to slide within the range of the slot 52. A spring 58, which is wound round the screw 59, has its one end attached to a screw 60 fixedly planted in the operating member 55, and the other end attached to a bent portion of the engaging member 57. Moreover, a return spring 61 is disposed between the respective parallel bent side portions of the fixed mounting plate 53 and the engaging member 57. Further, the fixed mounting plate 53 is provided with a bore 62 through which the push pin 37 of the mounting guide 36 is passed. Here a body 100 of the general-use camera is provided with no bore to be penetrated by the projection 56 of the engaging member 57. If the electronic flash device is attached to the general-use camera body 100, therefore, the projection 56 of the engaging member 57 will abut on the lateral face of the camera body 100, as shown in FIG. 9B. FIG. 9A shows an assembled state of the mechanism 51. Thus, when the electronic flash device is mounted on the camera body as shown in FIG. 9B, the projection 56 of the engaging member 57 hits against the side of the camera body, the return spring 61 is compressed, and the switch operating member 55 is swinged counterclockwise against the spring 58 round a point where it engages the extending portion 35 of the power switch 25. Hereupon, if the outwardly protruding top end portion 54 of the switch operating member 55 is moved clockwise as shown in FIG. 9C with a finger, the operating member 55 is swinged round the screw 59, and its lateral portion moves the extending portion 35 of the power switch 25 to the right. Thus, the power switch 25 is turned on. In response to the rightward movement of the projection 30 of the power switch 25, as described before, the on-off indicator 9 is projected. A similar procedure is followed in an operation to turn the power switch 25 off by pushing the indicator 9 into the flash device body. In this case, the operating member 55 is transferred from the position of FIG. 9C to the position of FIG. 9B in response to the leftward movement of the projection 35 of the power switch 25, thereby resetting the electronic flash device to the off state before the start of the flash photographing.

According to this invention, as stated above, the photographer may enjoy automatic flash photographing, easily making sure that the flash device is ready for the operation. Moreover, there may be obtained an electronic flash device that can also be used jointly with a general-use camera.

What is claimed is:

1. In an electronic flash device comprising a power switch, an indicating member for indicating by lightening the charging voltage in a main capacitor for flashing, and a flash device body to contain said members therein, the improvement comprising a member moving in response to on operation of said power switch and an interlocking mechanism for interlocking said switching member with said indicating member, so that said indicating member is projected outward from said flash device body by the operation of said power switch.

2. An electronic flash device according to claim 1 in which said power switch is turned on by moving a stop adjusting lever of a camera to a position for flash photographing.

3. An electronic flash device according to claim 1 in which said power switch is turned on by operating a switching lever provided for said flash device body.

4. An electronic flash device according to claim 1 in which said power switch is turned off in response to an operation to depress said indicating member into said flash device body.

5. An electronic flash device according to claim 1 in which said indicating member is held by legs formed of triangular members disposed in spaces defined between the inner walls of said flash device body and the outer wall of said capacitor for flashing contained in said body.

6. An electronic flash device according to claim 1 in which said flash device body has at least two chambers, one of said chambers containing said power switch, on-off indicating member, capacitor, and a mechanism for projecting said indicating member, and the other containing a battery for power supply.

7. An electronic flash device according to claim 1 in which said interlocking mechanism includes a guide groove formed of an engaging stepped portion on one wall surface of said switching member and a portion adjoining said engaging stepped portion, and a projection extending from one wall surface of said indicating member to be fitted in said guide groove, and that said indicating member is given an inclination to protrude outward from said flash device body, so that said indicating member may be projected outward by said inclination when said projection is released from said engaging stepped portion in response to the on operation of said power switch.

* * * * *